(12) United States Patent
Tranter et al.

(10) Patent No.: US 7,569,192 B2
(45) Date of Patent: Aug. 4, 2009

(54) SYSTEM FOR RECOVERY OF DAUGHTER ISOTOPES FROM A SOURCE MATERIAL

(75) Inventors: Troy J. Tranter, Idaho Falls, ID (US); Terry A. Todd, Aberdeen, ID (US); Leroy C. Lewis, Idaho Falls, ID (US); Joseph P. Henscheid, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 733 days.

(21) Appl. No.: 11/117,046

(22) Filed: Apr. 28, 2005

(65) Prior Publication Data

US 2006/0057038 A1   Mar. 16, 2006

Related U.S. Application Data

(62) Division of application No. 10/247,016, filed on Sep. 18, 2002, now Pat. No. 6,951,634.

(51) Int. Cl.
  *B01J 19/00*  (2006.01)
  *C22B 60/00*  (2006.01)
  *C22B 30/06*  (2006.01)

(52) U.S. Cl. ............... 422/159; 422/255; 422/261; 423/2; 423/3; 423/11; 423/249

(58) Field of Classification Search ............. 422/159
  See application file for complete search history.

(56) References Cited

U.S. PATENT DOCUMENTS 3,961,027 A * 6/1976 Crossley ............ 423/6
4,432,893 A * 2/1984 Lee et al. ............ 588/18
4,654,173 A * 3/1987 Walker et al. ............ 423/2
4,963,294 A * 10/1990 Yato et al. ............ 252/636
5,204,072 A   4/1993 Phillips
5,512,256 A   4/1996 Bray et al.
5,749,042 A   5/1998 Bray et al.
5,854,968 A   12/1998 Horwitz et al.
5,885,465 A   3/1999 Bray et al.
6,066,302 A   5/2000 Bray
6,153,154 A   11/2000 Egorov et al.

* cited by examiner

*Primary Examiner*—Jennifer A Leung
(74) *Attorney, Agent, or Firm*—TraskBritt

(57) ABSTRACT

A method of separating isotopes from a mixture containing at least two isotopes in a solution is disclosed. A first isotope is precipitated and is collected from the solution. A daughter isotope is generated and collected from the first isotope. The invention includes a method of producing an actinium-225/bismuth-213 product from a material containing thorium-229 and thorium-232. A solution is formed containing nitric acid and the material containing thorium-229 and thorium-232, and iodate is added to form a thorium iodate precipitate. A supernatant is separated from the thorium iodate precipitate and a second volume of nitric acid is added to the thorium iodate precipitate. The thorium iodate precipitate is stored and a decay product comprising actinium-225 and bismuth-213 is generated in the second volume of nitric acid, which is then separated from the thorium iodate precipitate, filtered, and treated using at least one chromatographic procedure. A system for producing an actinium-225/bismuth-213 product is also disclosed.

12 Claims, 3 Drawing Sheets

SYSTEM FOR RECOVERY OF DAUGHTER ISOTOPES FROM A SOURCE MATERIAL

CROSS-REFERENCE TO RELATED APPLICATION

This application is a divisional of U.S. application Ser. No. 10/247,016, filed Sep. 18, 2002, now U.S. Pat. No. 6,951,634, issued Oct. 4, 2005.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The invention pertains to methods of producing isotopes from a source material and a system for producing an actinium-225/bismuth-213 product.

BACKGROUND OF THE INVENTION

Radioisotopes are becoming increasingly useful in various scientific and medical fields. Many radioisotopes are currently used for research techniques such as radiolabeling for detection and monitoring purposes. In the medical field, numerous radionuclides are used for a variety of diagnostic and treatment techniques.

New immunotherapy techniques are currently being developed for treatment of various forms of cancer. Such techniques can include using a nuclide to label an antibody targeted to a tumor, thereby utilizing the labeled antibody to deliver the nuclide to the tumor site. The emissions generated by radioactive decay of the nuclide label can thereby be more selectively localized to the tumor site relative to other methods of radiotherapy.

In many techniques that utilize radionuclides, it can be desirable to utilize nuclides capable of generating alpha emissions. For example, nuclides that emit alpha particles of relatively high energy can be desirable for immunotherapy applications to maximize localization of decay emissions for the selective destruction of tumor cells while minimizing damage to surrounding tissues.

Although radioisotopes are becoming increasingly useful, it is often desirable to maximize purity of the nuclide prior to its ultimate use. However, desired radionuclides are often generated in very small quantities within other materials from which the nuclide must be separated. It is therefore desirable to develop methods of separating isotopes from source materials.

SUMMARY OF THE INVENTION

In one aspect, the invention encompasses a method of separating isotopes from a mixture. A mixture containing at least two isotopes is used to form a solution. A precipitate containing a first isotope is formed and is collected from the solution. One or more daughter isotopes are generated from the first isotope and at least one of the one or more daughter isotopes is collected.

In one aspect, the invention encompasses a method of producing an actinium-225/bismuth-213 product from a thorium source material. A thorium source material containing thorium-229 and thorium-232 is provided. A solution is formed containing a first volume of nitric acid and at least some of the thorium source material. Iodate is added to the solution and at least some of the iodate combines with thorium-229 and thorium-232 to form a thorium iodate precipitate. A supernatant containing at least some of the first volume of nitric acid is separated from the thorium iodate precipitate and a second volume of nitric acid is added to the thorium iodate precipitate. The thorium iodate precipitate is stored in the second volume of nitric acid for a generation time period during which a thorium-229 decay product comprising actinium-225 and bismuth-213 is generated. The second volume of nitric acid containing at least some of the thorium-229 decay product is separated from the thorium iodate precipitate and is filtered to remove at least some of any residual thorium iodate precipitate present. After filtering, the second volume of nitric acid is treated using at least one chromatographic procedure to separate actinium-225 and bismuth-213 from at least some of any impurities that are present in the second volume of nitric acid.

In another aspect, the invention includes a system for producing an actinium-225/bismuth-213 product.

BRIEF DESCRIPTION OF THE DRAWINGS

Preferred embodiments of the invention are described below with reference to the following accompanying drawings.

FIG. 3 is a graph depicting the generation of actinium-225 during a processing step of methodology of the present invention.

DETAILED DESCRIPTION OF THE PREFERRED EMBODIMENTS

Figure 1:
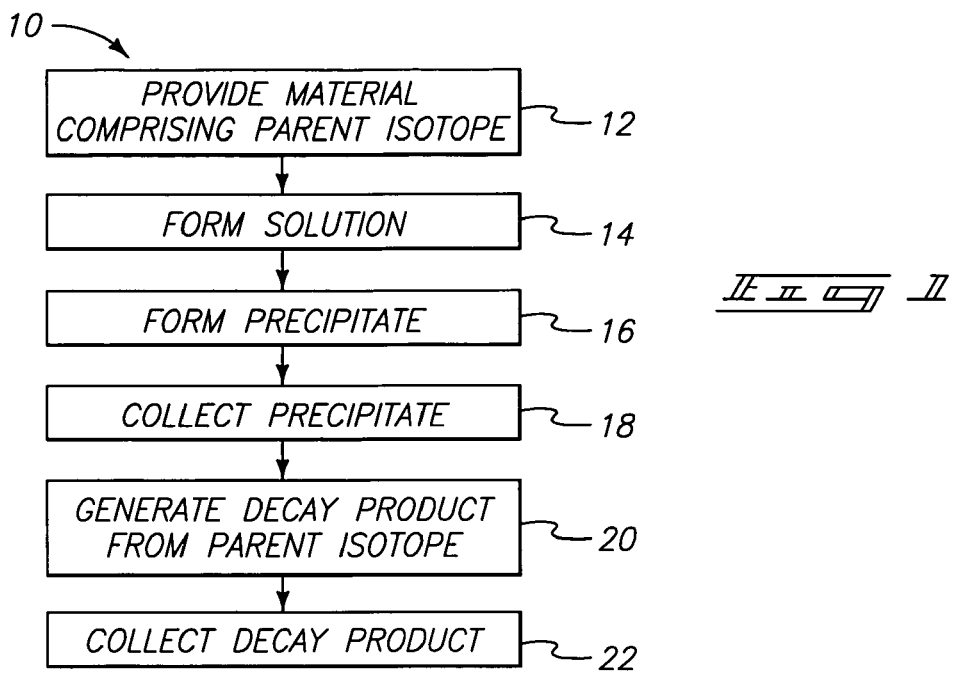
FIG. 1 is a block diagram flow chart view of a method encompassed by the present invention.

The invention encompasses methodology for separating isotopes from a mixture and also encompasses a system for producing isotopes utilizing methods of the present invention. A process encompassed by the present invention is described generally with reference to the block diagram of FIG. 1. In an isotope production flow scheme 10, a material comprising a parent isotope is provided in an initial act 12. The material provided in act 12 can comprise two or more isotopes, at least one of the isotopes present in the material being a parent isotope. For purposes of the present description, use of the term "parent isotope" can refer to an isotope capable of undergoing decay to produce a daughter isotope. Further decay of a daughter isotope can result in a "granddaughter" isotope of the original parent isotope. For purposes of the present description, the term "daughter isotope" can refer to a first decay product isotope generated from a parent or any subsequent decay product isotope generated from the first decay product isotope.

The material provided in act 12 can comprise any source material containing a parent isotope capable of generating a desired daughter isotope. In particular embodiments, the material provided in act 12 will contain a parent isotope capable of generating a daughter isotope that can further undergo alpha decay. In particular embodiments, the material provided in act 12 can comprise thorium-229. Alternatively, the material provided in act 12 can comprise thorium-228, or can comprise both thorium-228 and thorium-229.

Figure 2:
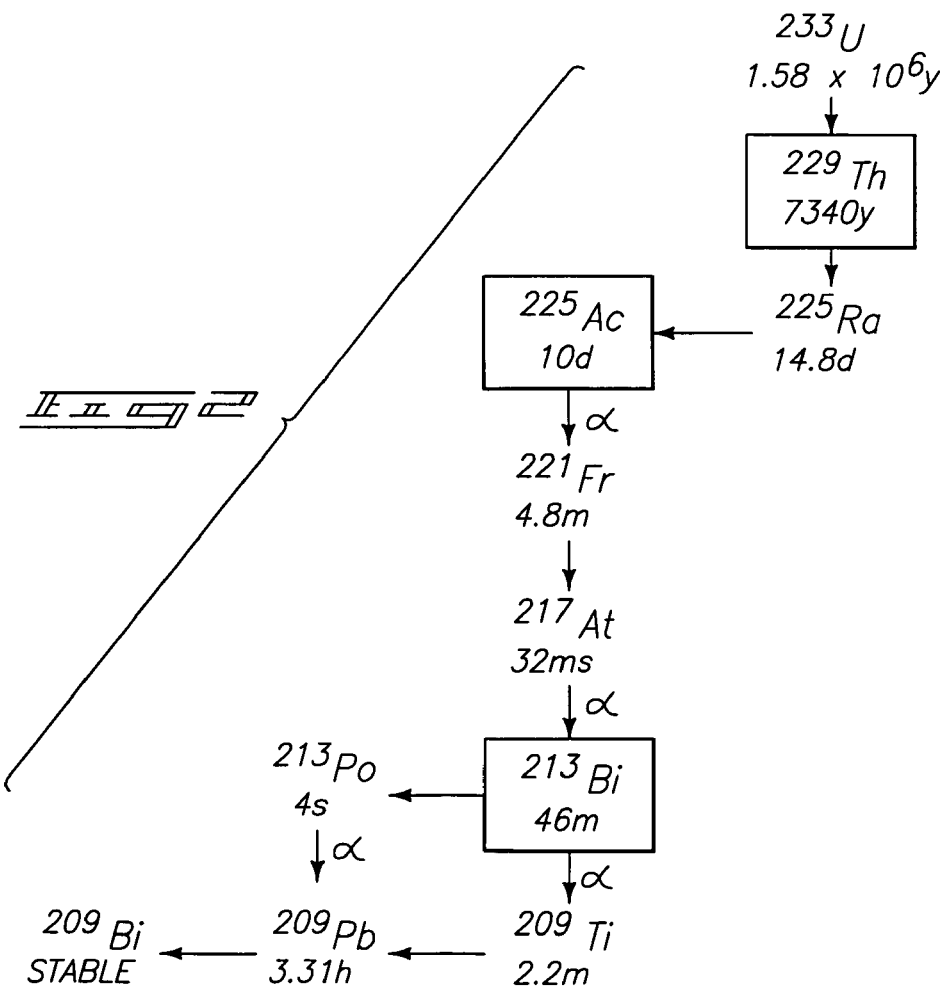
FIG. 2 is a block diagram illustration of the uranium-233 decay chain. The half-lives of radioisotopes are indicated in years (y), days (d), hours (h), minutes (m), seconds (s), or milliseconds (ms).
Figure 2:
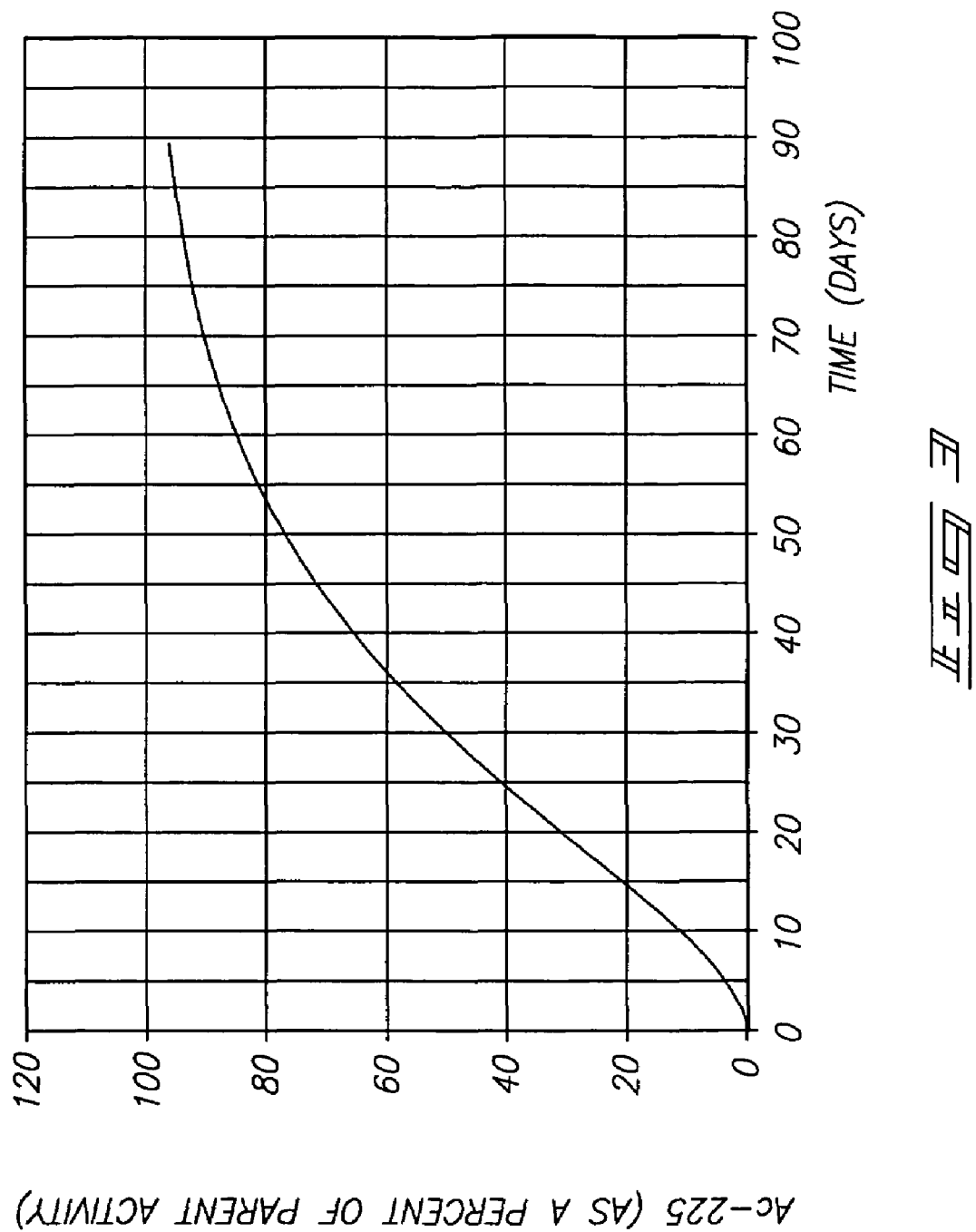

In embodiments of the present invention where the material provided in act 12 comprises thorium-229, the thorium-229 can function as a parent isotope. Referring to FIG. 2, which shows the decay chain of uranium-233, it is noted that thorium-229 is itself a decay product isotope resulting from decay of uranium-233. Thorium-229 can undergo a series of decays, as shown in FIG. 2, to produce thorium-daughters including actinium-225. Actinium-225 can further undergo a series of decays to generate daughters that include bismuth-213. As shown in FIG. 2, bismuth-213 is capable of decay by alpha emission. Additionally, bismuth-213 has a half-life of forty-six minutes and undergoes a series of decays to form a stable isotope bismuth-209. Accordingly, a thorium-229 comprising source material can be utilized in act 12 of FIG. 1 for generation of one or both of actinium-225 and bismuth-213 by methods of the present invention.

A thorium-229 source material in act 12 can comprise additional thorium isotopes such as, for example, thorium-232. The methods of the present invention do not require a specific purity of thorium-229 and can utilize materials comprising any specific activity of thorium-229/thorium-2XX. An exemplary thorium source material can comprise a thorium-229/thorium-2XX ratio of as little as 50 grams of thorium-229 to about 14 metric tons of thorium-232. Alternatively, a higher purity of thorium-229 can be utilized but is not required for methods of the present invention.

A thorium-229 source material can comprise additional non-thorium isotopes such as, for example, uranium-233. A uranium/thorium (U/Th) source material can comprise any uranium to thorium ratio. An exemplary material for utilization in act 12 can comprise an unirradiated U/Th nuclear fuel, such as U/Th oxide fuel pellets. U/Th fuel pellets can be any available pellet size such as, for example, pellets comprising a length of about 0.5 inch and a diameter of about 0.5 inch.

The material provided in act 12 can be processed to form a solution in act 14. Solution formation of act 14 can comprise mixing the material comprising a parent isotope from act 12 with a solvent such as an acid solution, for example, a nitric acid solution. A nitric acid solution useful for dissolving the parent isotope material can comprise from about 8 M nitric acid to about 14.9 M nitric acid, and preferably comprises about 13.6 M nitric acid.

Solution formation of act 14 can further comprise addition of a catalyst to enhance the dissolving. For example, the dissolving can be catalyzed by addition of from 0.01 M hydrofluoric acid to about 0.05 M hydrofluoric acid. Additionally, the solution formation of act 14 can comprise either intermittent or continuous stirring to assist the dissolving of the parent isotope source material. Solution formation of act 14 can comprise a temperature from ambient temperature to about 300° C. If a temperature above ambient temperature is utilized, the increase in temperature above ambient can be accompanied by a corresponding increase in pressure.

Preferably, the parent isotope material is fully dissolved during solution formation of act 14. Alternatively, the solution can be treated, for example, by filtering, to remove non-dissolved material prior to subsequent processing.

The solution comprising parent isotope source material can be treated to selectively precipitate one or more isotopes from the solution in precipitation of act 16. Precipitate formation of act 16 preferably produces a precipitated material comprising at least one desired parent isotope. The precipitation can comprise using one or more ion species capable of combining with the parent isotope to form a precipitate. The one or more ion species can be provided by, for example, addition of one or more salts to the solution. Salt can be added in solid form or in a stock solution.

In embodiments of the present invention where a thorium source material is utilized, thorium isotopes including thorium-229 parent isotope can be precipitated from the solution formed in act 14 by addition of, for example, iodate ion in act 16. Preferably, the amount of iodate added to a solution comprising thorium will exceed the total amount of thorium isotopes dissolved in the solution. It can be advantageous to add an excess stoichiometric ratio of iodate relative to the total concentration of all thorium isotopes present in the tank to maximize thorium iodate precipitation.

Providing iodate to the thorium solution in act 16 can additionally comprise formation of a stock iodate solution which can be formed by combining nitric acid with one or more iodate salts selected from the group consisting of $KIO_3$, $NaIO_3$, or $HIO_3$. An exemplary stock iodate solution can comprise 1 M iodate and 6 N nitric acid. It can be advantageous to form the stock iodate solution utilizing the acid iodate salt to avoid introducing counter ions that can potentially interfere with any downstream chemistry. It is to be noted that the iodate stock solution concentration is exemplary and any concentration of stock solution can be utilized for precipitation of act 16.

A precipitation collection of act 18 can be performed to collect the precipitate formed in act 16. Precipitate collection of act 18 can comprise, for example, removal of the supernatant to separate the precipitate from materials that remain dissolved in the solution. In embodiments of the present invention that utilize a U/Th parent isotope source material in act 12, precipitation collection of act 18 can comprise separation of a precipitated thorium material, such as thorium iodate, from a supernatant comprising uranium. Supernatant removal can comprise a filtration process such as, for example, cross-flow filtration. In embodiments wherein the recovered supernatant comprises uranium, such supernatant can be sent to a uranium storage unit where any soluble thorium daughters present in the supernatant will eventually decay. After storage of the recycled uranium for a length of time to produce a sufficient amount of thorium-229, the stored material can be reprocessed utilizing methods of the present invention.

Precipitate collection of act 18 can optionally include a precipitate wash step to minimize or eliminate any residual uranium present after removal of the initial supernatant. The precipitate wash step can comprise one or more rounds of a wash solution, followed by removal of the wash solution. Removal of the wash solution can comprise, for example, filtration including, but not limited to, cross-flow filtration.

In embodiments of the present invention wherein the precipitate collected in act 18 comprises thorium, an appropriate wash solution can comprise, for example, a salt and acid solution, preferably a nitric acid iodate solution. It can be advantageous to utilize an iodate solution for washing a thorium precipitate collected in act 18 to minimize or eliminate any dissolving of the thorium precipitate during the washing. An exemplary wash solution for washing a thorium iodate precipitate can comprise about 1 M iodate and from about 4 N nitric acid to about 7 N nitric acid. An exemplary washing step for washing a thorium precipitate can comprise, for example, three rounds of washing, wherein each washing step adds a volume of a nitric acid iodate solution, followed by removal of the volume of wash solution by, for example, cross-flow filtration. The washing of thorium iodate precipitate by methods of the present invention can minimize any residual uranium remaining in the collected precipitate.

Although isotope production flow scheme 10 shows a single series of acts 12-18, it is to be understood that additional rounds of providing a parent isotope material of act 12, solution formation of act 14, precipitation of act 16, and collection of the precipitate of act 18 can be performed, and the resulting precipitates can be combined to create a desired amount of precipitate for further processing. The collected precipitates can be combined either prior to, or subsequent to washing of precipitates. The resulting combined precipitates can then be utilized for further processing according to methods of the present invention.

The precipitate collected in act 18 can be utilized to generate decay products from a parent isotope in act 20. The generation of decay products in act 20 can comprise storing a precipitate from act 18 for a storage period of a sufficient time length to generate a decay product, also called an "in-growth" period. It is possible to determine an appropriate in-growth period for generation of a daughter isotope based upon the activity of the parent isotope and the half-life of the daughter isotope. For example, referring to FIG. 3 which shows an in-growth curve of actinium-225 as a percent of thorium-229 activity over time, it can be seen that the amount of actinium-225 that can be generated and collected from a thorium-229 comprising precipitate reaches a maximum in-growth level by approximately 100 days.

Although the recoverable amount of actinium cannot be increased by in-growth periods of longer than approximately 100 days, in some instances it may be advantageous to store thorium-229 comprising precipitate for longer than a 100 day period based on product demand. For example, it may be advantageous to delay collection of a decay product comprising actinium-225 generated from a thorium-229 comprising precipitate to minimize the amount of actinium-225 decay that occurs between decay product collection and any subsequent delivery or use of an actinium-225 or actinium-225/bismuth-213 (Ac-225/Bi-213) product (discussed below). Accordingly, a thorium-229 comprising precipitate can be incubated to allow in-growth of actinium-225 for a period of zero to greater than 100 days. Preferably, the in-growth period can be from ten and 100 days and in particular embodiments can comprise an amount of time determined by product demand.

A storage solution can be utilized for storage of the precipitate during the in-growth incubation period and can preferably provide selective solubilization of at least one decay product relative to its parent isotope. Storage of act 20 preferably comprises storage of the precipitate in a storage solution capable of minimizing any dissolving of the precipitate. Preferably, the parent isotope precipitate will comprise a very low solubility in the storage solution and at least one daughter isotope generated from the parent isotope will comprise an increased solubility in the storage solution relative to the precipitate comprising the parent isotope.

An exemplary storage solution for storage of collected precipitates comprising parent isotope thorium-229 can comprise nitric acid and iodate. The nitric acid iodate storage solution can comprise, for example, the concentrations of nitric acid and iodate discussed above with respect to the wash solution. Thorium iodate has a very low solubility in nitric acid solutions and can comprise a solubility ($k_s$) of about $2.5 \times 10^{-15}$ in the presence of a stoichiometric excess of iodate relative to thorium. Daughter isotopes that result from decay of thorium-229 such as, for example, actinium-225 and bismuth-213, have an increased solubility in a storage solution comprising nitric acid and iodate relative to the thorium iodate precipitate. Accordingly, a decay product comprising one or both of actinium-225 and bismuth-213 (hereafter referred to as an Ac-225/Bi-213 decay product) can be generated from parent isotope thorium-229 and the resulting Ac-225/Bi-213 decay product can be dissolved by the storage solution.

Migration or diffusion of decay products out of a crystal precipitate during the in-growth storage can be enhanced by agitation of the precipitate. The agitation can preferably be constant agitation and can utilize, for example, mixing, stirring, air sparging or sparging with an inert gas.

After an appropriate in-growth storage period for generation of decay products in act 20, a decay product collection of act 22 can be performed. Collection of a decay product in act 22 can comprise removing dissolved decay product from the parent isotope by separating the storage solution as a liquid fraction from the precipitate comprising the parent isotope. For example, in embodiments wherein the precipitate comprises parent isotope thorium-229, an Ac-225/Bi-213 decay product can be recovered in a liquid fraction comprising the storage solution since the actinium and bismuth daughter isotopes have higher solubilities in the storage solution than does the thorium iodate precipitate.

Collection of a decay product in act 22 can comprise separation of a liquid fraction from a solid fraction by, for example, utilization of one or more filtration techniques including, but not limited to, cross-flow filtration. Upon removal, the filtrate can be recycled for additional use as a storage solution. After removal of the liquid fraction, a solid portion comprising a parent isotope can be used to generate additional quantities of decay product by repeated rounds of sequentially adding storage solution to the precipitate, and incubating the recovered precipitate for an additional in-growth period to generate additional decay product.

Decay product collection of act 22 can further comprise a purification process involving one or more purification techniques designed to minimize any residual parent isotope or other impurity present in the fraction comprising the decay product. Purification techniques that can be utilized in the decay product collection of act 22 include, for example, one or both of extraction chromatography techniques and column chromatography techniques, including but not limited to, ion exchange chromatography. It can be advantageous to use chromatographic techniques that are compatible with the storage solution to avoid having to change solvents prior to the chromatographic step. It is to be understood, however, that the present invention contemplates chromatography techniques utilizing alternative, non-storage solvent systems.

In particular embodiments of the present invention, purification treatment can comprise a series of column chromatography steps utilizing at least two different chromatographic separation techniques. For example, a first column chromatography step can be specifically designed to separate daughter isotopes comprised by the decay product from a residual parent isotope. A second column chromatography act can be specifically configured to separate any non-parent isotope impurities present in the storage solution from the daughter isotope product. Alternatively, the exemplary column chromatography techniques can be performed in the reverse order. Additional chromatography techniques can be utilized to maximize purity of the decay product collected in act 22.

The decay product collected in act 22 can be contained in a vessel prior to its ultimate use. Preferably, the vessel is inert to the collected products and any additional products produced by further decay. Additionally, the vessel is preferably inert to a final solvent containing the collected decay product. When the end use of the product is at a location remote from the site of decay product generation, the vessel can further serve as a shipping vessel for delivery of the decay product to the site of its end use.

In particular embodiments of the present invention, the collected decay product can be retained on a chromatography column which can serve as a containment vessel until the decay product end use. Further, a column comprising the retained decay product can be utilized as a shipping vessel to deliver the product to a desired use site. In embodiments having the decay product retained on a column, the decay product can be eluted or stripped from the column at the use site.

Elution of the decay product from the final chromatography step involved in product purification can comprise elution into a final eluent designed to be compatible with a particular end use. For example, in embodiments wherein the product will be utilized for medical purposes, the decay product can be eluted from a final purification column utilizing a elution system that is compatible with a medical use. Alternatively, the eluted product can be dried, shipped, and re-dissolved in a use-compatible solvent at the use site.

The chromatographic steps utilized in decay product purification can further serve to concentrate the decay products into a final volume. Alternatively, an additional concentration step can be performed to concentrate the decay product.

An exemplary system which can be utilized for performing methods encompassed by the present invention is described with reference to FIG. 4. An isotope decay product production system 100 is shown. Isotope decay product production system 100 can be used, for example, for production of an Ac-225/Bi-213 decay product generated from a thorium comprising source material. For purposes of the present description, production system 100 can be referred to as an Ac-225/Bi-213 production system. Although production system 100 is described as an Ac-225/Bi-213 production system, it is to be understood that the present invention contemplates use of production system 100 for production of other decay products including products generated from non-thorium source material.

Ac-225/Bi-213 production system 100 can comprise an isotope source 101 configured to provide an isotope source material, for example, a thorium-229 source material, into a dissolver unit 102. A solution can be formed in dissolver unit 102 by providing a solvent comprising, for example, 13.6 N nitric acid. Dissolving thorium-229 source material in dissolver unit 102 can be catalyzed by, for example, providing from about 0.01 N hydrofluoric acid to about 0.05 N hydrofluoric acid into dissolver unit 102.

Dissolver unit 102 can be configured to stir the mixture during the dissolving. Further, the dissolving can comprise a temperature from about ambient temperature to about 300° C.

After dissolving at least some of the thorium-229 source material to form a solution, the solution can be fed into a precipitation tank 104. The solution can be fed into precipitation tank 104 continuously or alternatively can be provided batch wise. Preferably, the solution is provided into the precipitation tank 104 batch wise.

A thorium precipitate can be formed within precipitation tank 104 by, for example, providing a salt source 106 configured to provide a salt to the precipitation tank 104. Salt source 106 can comprise, for example, a salt solution containing an iodate salt stock solution comprising nitric acid, as discussed above. Iodate provided to precipitation tank 104 can combine with dissolved thorium isotopes to form a thorium iodate precipitate. The thorium iodate precipitate can comprise any of the thorium isotopes contained in the thorium source material including, but not limited to, thorium-229 and thorium-232. It is advantageous to provide a concentration of iodate to precipitation tank 104 that stoichiometrically exceeds a total concentration of thorium isotopes within the precipitation tank 104 to maximize and maintain precipitation of thorium iodate.

After formation of the thorium iodate precipitate within precipitation tank 104, a supernatant can be removed to separate at least some of any non-precipitated materials from the thorium iodate precipitate. In embodiments where the supernatant contains dissolved uranium, the supernatant can be provided to a uranium storage unit 105. The supernatant can be removed from precipitation tank 104 by, for example, draining off the supernatant or by filtration, for example, by cross-flow filtration (not shown).

After removal of the supernatant, the thorium iodate precipitate can be washed to minimize any residual uranium or any other soluble impurities by, for example, repeated rounds of sequentially adding a volume of a wash solution to precipitation tank 104 and subsequent removal of the wash solution from the precipitation tank 104. The acid iodate wash solution can be formed, for example, as discussed above. It can be advantageous to wash the thorium precipitate a number of times, for example, using three rounds of washing, to maximize removal of any residual uranium or other soluble impurities.

The resulting thorium iodate precipitate can be combined with other thorium iodate precipitates produced by methods of the present invention prior to subsequent processing. After the removal of the supernatant and optional wash steps, a volume of storage solution comprising nitric acid and iodate can be added to the thorium iodate precipitate in precipitation tank 104. The thorium iodate precipitate can be stored in precipitation tank 104 for an in-growth period sufficient to generate at least some decay product. Preferably, the thorium iodate precipitate is stored in precipitation tank 104 for an in-growth period of from about ten to about 100 days and more preferably for about 30 days. A preferred temperature for storage of the thorium iodate precipitate can be from about 5° C. to about 30° C. It is to be understood that higher storage temperatures are contemplated. During the in-growth period, the thorium iodate precipitate in storage solution can be agitated by mixing or sparging to enhance diffusion of daughter isotopes, such as actinium-225 and bismuth-213 out of the crystal thorium iodate precipitate.

Upon expiration of the in-growth time period, a liquid fraction containing a decay product can be removed from the precipitation tank 104. Removal of a liquid fraction from precipitation tank 104 can comprise utilization of a separator 108. Separator 108 can comprise, for example, a filtration system, such as, for instance, a cross-flow filtration system. In embodiments of the present invention where separator 108 comprises cross-flow filtration, the cross-flow filter can be configured such that dissolved thorium daughters will pass through an inner membrane while any thorium iodate precipitate present can be retained within an inner diameter of the cross-flow filter. The cross-flow filtration system can comprise an internal pressure gradient across a membrane of from about 20 lbs to about 500 lbs. The thorium daughters can thereby be recovered from the cross-flow filtration system and can be further purified as discussed below.

Ac-225/Bi-213 production system 100 can be further configured such that any thorium iodate precipitate that is retained within an inner diameter of a cross-flow filter of separator 108 can be recycled back to precipitation tank 104 as indicated by recycle path 110. The thorium iodate precipitate remaining in precipitation tank 104 can be utilized for a subsequent round of thorium decay product generation.

The thorium decay product collected from separator 108 can comprise at least one of actinium-225 and bismuth-213 (Ac-225/Bi-213), preferably the decay product comprises both actinium-225 and bismuth-213. After collection from separator 108, the Ac-225/Bi-213 decay product can be further purified utilizing a first purifier 112. First purifier 112 can comprise, for example, an anion exchange column comprising, for instance, DOWEX® 1×8 resin (Dow Corning Corp., Michigan, U.S.A.). Alternatively, other extraction chromatography methods or column chromatography techniques, including alternate anion exchange techniques, can be utilized for selectively separating thorium from its soluble daughter isotopes. It can be advantageous to use DOWEX® 1×8 resin for separating thorium from Ac-225/Bi-213 decay product since DOWEX® 1×8 resin is compatible with the nitric acid storage solvent and can avoid an added step of changing solvent prior to first purifier 112.

Ac-225/Bi-213 production system 100 can be further configured to provide a recycle pathway 114 to deliver thorium recovered from first purifier 112 back to precipitation tank 104.

The Ac-225/Bi-213 decay product recovered from first purifier 112 can be provided to a second purifier 116. Second purifier 116 can comprise, for example, a cation exchange column. Alternatively, second purifier 116 can comprise extraction chromatography or other column chromatography techniques capable of selective separation of actinium and actinium daughters from other materials present in the nitric acid storage solution. Ac-225/Bi-213 product can be selectively eluted or stripped from the cation exchange column of second purifier 116 and can be provided to a collector 120. Ac-225/Bi-213 production system 100 can further comprise a recycle pathway 118 configured to deliver nitric acid and/or iodate recovered from second purifier 116 back to precipitation tank 104.

Figure 4:
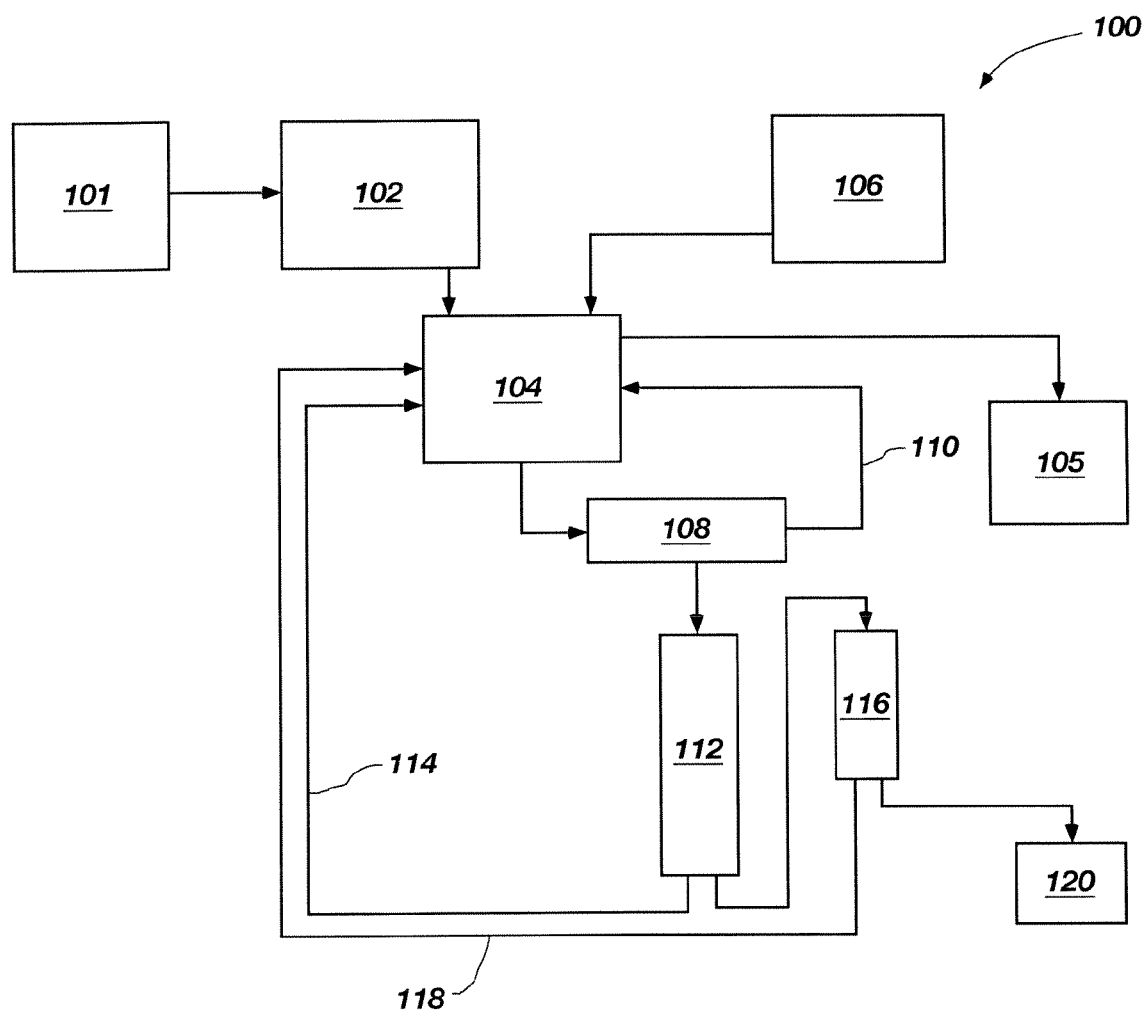
FIG. 4 is a schematic view showing an exemplary production system that can be utilized in performing methods of the present invention.

Although FIG. 4 shows two purifiers, it is to be understood that Ac-225/Bi-213 production system 100 can comprise a single purifier or more than two purifiers (not shown). Preferably, Ac-225/Bi-213 production system 100 comprises sufficient purifiers to produce a desired decay product purity. In particular embodiments of the present invention where the Ac-225/Bi-213 product is intended for medical use, Ac-225/Bi-213 production system 110 will comprise a sufficient number of purifiers for production of a medical grade Ac-225/Bi-213 decay product.

In particular embodiments of the present invention, the decay product produced by production system 100 will be utilized as a source of an isotope capable of alpha emission. For example, an Ac-225/Bi-213 decay product can be used as a source for generation of bismuth-213, which is capable of decay by alpha emission as shown in FIG. 2. In particular embodiments, collector 120 can comprise a containment vessel configured for delivery of the decay product to a user. When a decay product produced by production system 100 comprises an Ac-225/Bi-213 product, the containment vessel can preferably comprise a material that is inert to actinium-225 and the decay products of actinium-225, and also inert to a solvent used to elute or strip the decay product from second purifier 116.

In particular embodiments of the present invention, second purifier 116 can be utilized as the containment vessel. For example, an Ac-225/Bi-213 decay product produced by production system 100 can be retained within second purifier 116 and can be eluted just prior to use.

An Ac-225/Bi-213 product produced according to methods of the present invention can be used, for example, as a source of bismuth-213 for generation of alpha decay emissions. Bismuth-213 can decay by producing alpha emissions having an extremely high energy of about 8.4 MeV. Due to its ability to produce high energy alpha emissions, bismuth-213 can be especially desirable for use as a nuclide for use in immunotherapy applications. Accordingly, the present invention can be utilized for production of bismuth-213 for uses such as research, medical diagnostics and medical treatments, including immunotherapy.

Although the embodiments discussed above refer to production of actinium-225 and/or bismuth-213, the invention can be utilized for production of radium-224 and/or its decay product bismuth-212. Thorium-228, which is a parent isotope of radium-224, occurs in very low quantities in natural thorium. The methods discussed above can be utilized to precipitate thorium-228 and to recover soluble daughters therefrom. Further, the separation and purification methods discussed above can be adapted to selectively separate a Ra-224/Bi-212 product from a thorium-228 source material.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for producing bismuth-213, comprising:
   a dissolver unit;
   a precipitation tank configured to receive a dissolved thorium material from the dissolver unit;
   a salt source configured to deliver one or more salt species to the precipitation tank;
   a separator configured to receive a liquid fraction comprising a thorium decay product including at least one of actinium-225 and bismuth-213 from the precipitation tank;
   at least one chromatography column configured to receive the thorium decay product including at least one of actinium-225 and bismuth-213 from the separator;
   a collector configured to receive and retain at least one of actinium-225 and bismuth-213 from the at least one chromatography column;
   at least one recycle pathway configured to deliver thorium recovered from the at least one chromatography column to the precipitation tank; and
   a pathway for delivering a supernatant from the precipitation tank to a storage.

2. The system of claim 1, wherein the at least one chromatography column comprises a plurality of chromatography columns in series, the at least one recycle pathway comprises a recycle pathway from each of the plurality of chromatography columns to the precipitation tank, and the collector is configured to receive the at least one of actinium-225 and bismuth-213 from a last in the series of the plurality of chromatography columns.

3. The system of claim 1, wherein the separator is a cross-flow filtration device.

4. The system of claim 1, wherein the salt source is an iodate salt source.

5. The system of claim 1, further comprising:
   a source of thorium material, wherein the thorium material comprises thorium and uranium; and
   wherein the storage comprises a uranium storage and wherein the supernatant comprises dissolved uranium.

6. The system of claim 1, wherein the separator is configured to separate at least some of any thorium present in the liquid fraction from the at least one of actinium-225 and bismuth-213 to produce a thorium recovery fraction, and wherein the thorium recovery fraction is recycled back into the precipitation tank.

7. A system for producing bismuth-212, comprising:
   a dissolver unit;
   a precipitation tank configured to receive a dissolved thorium material from the dissolver unit;
   a salt source configured to deliver one or more salt species to the precipitation tank;
   a separator configured to receive a liquid fraction comprising a thorium decay product including at least one of radium-224 and bismuth-212 from the precipitation tank;
   at least one chromatography column configured to receive the thorium decay product including at least one of radium-224 and bismuth-212 from the separator;
   a collector configured to receive and retain at least one of radium-224 and bismuth-212 from the at least one chromatography column;
   at least one recycle pathway configured to deliver thorium recovered from the at least one chromatography column to the precipitation tank and
   a pathway for delivering a supernatant from the precipitation tank to a storage.

8. The system of claim 7, wherein the at least one chromatography column comprises a plurality of chromatography columns in series, the at least one recycle pathway comprises a recycle pathway from each of the plurality of chromatography columns to the precipitation tank, and the collector is configured to receive the at least one of radium-224 and bismuth-212 from a last in the series of the plurality of chromatography columns.

9. The system of claim 7, wherein the salt source is an iodate salt source.

10. The system of claim 7, wherein the separator is a cross-flow filtration device.

11. The system of claim 7 further comprising:
    a source of thorium material, wherein the thorium material comprises thorium and uranium; and
    wherein the storage comprises a uranium storage and wherein the supernatant comprises dissolved uranium.

12. The system of claim 7, wherein the separator is configured to separate at least some of any thorium present in the liquid fraction from the at least one of radium-224 and bismuth-212 to produce a thorium recovery fraction, and wherein the thorium recovery fraction is recycled back into the precipitation tank.

* * * * *